INVENTOR.
Bradley J. McKenzie

United States Patent Office 3,365,881
Patented Jan. 30, 1968

3,365,881
GAS TURBINE IGNITION DETECTOR
Bradley J. McKenzie, Shrewsbury, Mass., assignor to United Aircraft Corporation, East Hartford, Conn., a corporation of Delaware
Filed Sept. 8, 1965, Ser. No. 485,678
10 Claims. (Cl. 60—39.14)

ABSTRACT OF THE DISCLOSURE

In general my invention contemplates the provision of an exhaust gas temperature sensor. In one embodiment of my invention the output of this temperature sensor is coupled through a high-pass filter to operate a trigger circuit which enables the main fuel flow. In another embodiment of my invention the output of the temperature sensor is directly applied to one input of a differential amplifier and is coupled through a low-pass filter to the other input of the differential amplifier. The differential amplifier actuates a trigger circuit which again enables the main fuel flow. In both embodiments of my invention, changes in ambient temperature do not occur at a sufficient rate to actuate the trigger circuit. I detect changes in temperature or temperature increments rather than absolute temperature values.

---

My invention relates to gas turbine engines and, more particularly, to a detector for sensing light-off or ignition in such engines.

Where a plurality of parallel connected gas turbines are employed as gas generators to drive a single free turbine, it is essential to determine whether light-off or ignition has actually occurred in each of the gas generators. Initially, each gas generator is brought to a certain speed and then pilot fuel is supplied accompanied by actuation of an igniter. Thereafter the main fuel valve is actuated to accelerate the gas generator to operating speed. If ignition in one of the parallel connected gas generators does not take place, then upon operation of its main fuel valve, large quantities of raw fuel will accumulate. However, if ignition has occurred in any other gas generator, then the hot exhaust gases from this generator could cause the accumulated fuel in the first gas generator to explode.

In my invention the main fuel flow to an engine is inhibited until it is assured that ignition or light-off has occurred by virtue of a predetermined temperature rise in exhaust gas temperature of such engine. My ignition detector operates independently of wide changes in ambient temperature.

One object of my invention is to provide a circuit which inhibits the main fuel flow of a gas turbine engine until ignition has occurred.

Another object of my invention is to provide a gas turbine ignition detector which senses a predetermined exhaust gas temperature rise indicative of ignition.

A further object of my invention is to provide a gas turbine ignition detector which operates independently of wide changes in ambient temperature.

Other and further objects of my invention will appear from the following description.

In the accompanying drawings which form part of the instant specification and which are to be read in conjunction therewith and in which like reference numerals are used to indicate like parts in the various views.

Figure 1:
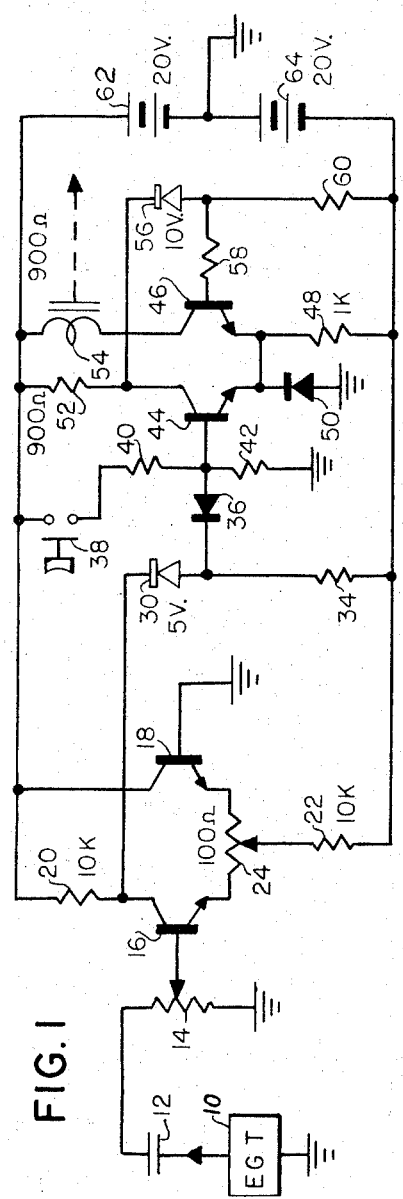
FIGURE 1 is a schematic view showing the first embodiment of my invention employing a high-pass filter circuit.

More particularly referring now to FIGURE 1 of the drawings, an exhaust gas temperature transducer 10 is connected to one plate of a capacitor 12, the other plate of which is coupled through the resistance winding of a potentiometer 14 to ground. The slider of potentiometer 14 is connected to the base of a transistor 16. The negative terminal of a 20 volt battery 62 and the positive terminal of a 20 volt battery 64 are grounded. The positive terminal of battery 62 is connected to the collector of a transistor 18 and is further coupled through a 10 kilohm resistor 20 to the collector of transistor 16. The base of transistor 18 is grounded. The emitters of transistors 16 and 18 are connected through the resistance winding of a 100 ohm balancing potential 24, the slider of which is coupled through a 10K resistor 22 to the negative terminal of battery 64. The collector output of transistor 16 is connected to the cathode of a 5 volt Zener diode 30. The anode of Zener diode 30 is coupled through a resistor 34 to the negative terminal of battery 64 and is further coupled backwardly through a rectifier 36 to the base of a transistor 44. The base of transistor 44 is grounded through a resistor 42. The emitters of transistor 44 and of a transistor 46 are connected through a common 1K emitter resistor 48 to the negative terminal of battery 64. The emitters of transistors 44 and 46 are also connected backwardly through a rectifier 50 to ground. The collector of transistor 44 is connected to the cathode of a 10 volt Zener diode 56 and is further coupled through a 900 ohm resistor 52 to the positive terminal of battery 62. The collector of transistor 46 is connected to the positive terminal of battery 62 through a 900 ohm winding 54 which enables the main fuel flow. The anode of Zener diode 56 is connected through a resistor 60 to the negative terminal of battery 64 and is further coupled to the base of transistor 46 through a resistor 58. The base of transistor 44 is also serially connected through a resistor 40 and a normally-open, manually-actuable switch 38 to the positive terminal of battery 62.

In operation of the circuit of FIGURE 1, capacitor 12 and potentiometer 14 form a high-pass filter; transistors 16 and 18 form a balanced, direct-current amplifier; and transistors 44 and 46 form a trigger circuit. The quiescent potential at the collector of transistor 16 should be 10 volts so that the quiescent potential at the anode of Zener diode 30 will be 5 volts. If there exists a mismatch in the characteristics of transistors 16 and 18, the slider of potentiometer 24 may be moved from its center position in order to establish the proper quiescent condition. This backwardly biases rectifier 36 by 5 volts. Transistor 44 is conductive; and transistor 46 is nonconductive, since its emitter is substantially at ground potential while its base is at a potential of substantially −8 volts. Accordingly, no current flows through winding 54; and the main fuel flow is inhibited.

If the pilot fuel is ignited, then the exhaust gas temperature will rise at a rapid rate compared with the slowly varying changes in ambient temperature, producing, for example, a positive-going signal at the base of transistor 16. The increased collector current of transistor 16 causes a decrease in its collector potential and a corresponding decrease in the potential at the anode of Zener diode 30. When the anode of Zener diode 30 drops below ground potential, conduction takes place through rectifier 36 driving the base and hence the emitter of transistor 44 negative. Rectifier 50 is now rendered conductive, preventing any further negative excursion of the emitter of transistor 44, which now acts as a high-gain, grounded-emitter amplifier. Conduction through transistor 44 decreases; and its collector potential rises. When the anode of Zener diode 56 reaches ground potential, transistor 46 begins to conduct; and regenerative action takes place, since a rise in potential occurs at the common emitters of transistors 44 and 46 which further reduces conduction through transistor 44. Transistor 44 is rendered non-conductive and transistor 46 is rendered conductive. Neglecting any voltage drop across transistor 46, the current flow through winding 54 and resistor 48 is approximately 21 ma. The drop across winding 54 is 19 volts; and the drop across resistor 48 is 21 volts. The potential at the common emitters of transistors 44 and 46 is thus +1 volt. Even if no current were to flow through rectifier 36, so that resistor 42 maintained the base of transistor 44 at ground potential, still transistor 44 would be completely cut-off by virtue of the 1-volt negative bias. The current flow through winding 54 produces a magnetic field which may be used either to operate a relay solenoid which enables the main fuel flow or to actuate a flapper valve in an hydraulic servo which enables the main fuel flow.

If an engine is shut down and then restarted, the flip-flop comprising transistors 44 and 46 must be reset. Push button 38 is actuated upon a restart to supply a positive voltage at the base of transistor 44. The base of transistor 44 must be driven at least to the +1 volt potential which exists at the common emitters of transistors 44 and 46 when transistor 46 is conductive. Preferably the ratio of resistors 40 and 42 is such that the actuation of switch 38 supplies appreciable base current to transistor 44 in order to insure reset.

The ignition of the pilot fuel usually results in an exhaust gas temperature rise of between 50° and 100° F. The value of capacitor 12 should be sufficiently small that slowly varying changes in ambient temperature produce substantially no voltage across the resistance winding of potentiometer 14. However, the value of capacitor 12 should be sufficiently large that rapid changes in exhaust gas temperature, due to the ignition of pilot fuel, appear substantially unattenuated across the resistance winding of potentiometer 14. The slider of potentiometer 14 may be adjusted, for example, so that a rapid change in exhaust gas temperature of 25° F. produces a 5 volt decrease in the collector potential of transistor 16. With this adjustment in gain, the flip-flop will be triggered if the ignition of pilot fuel results in a rise in exhaust gas temperature of only slightly more than half the minimum expected value.

Figure 2:
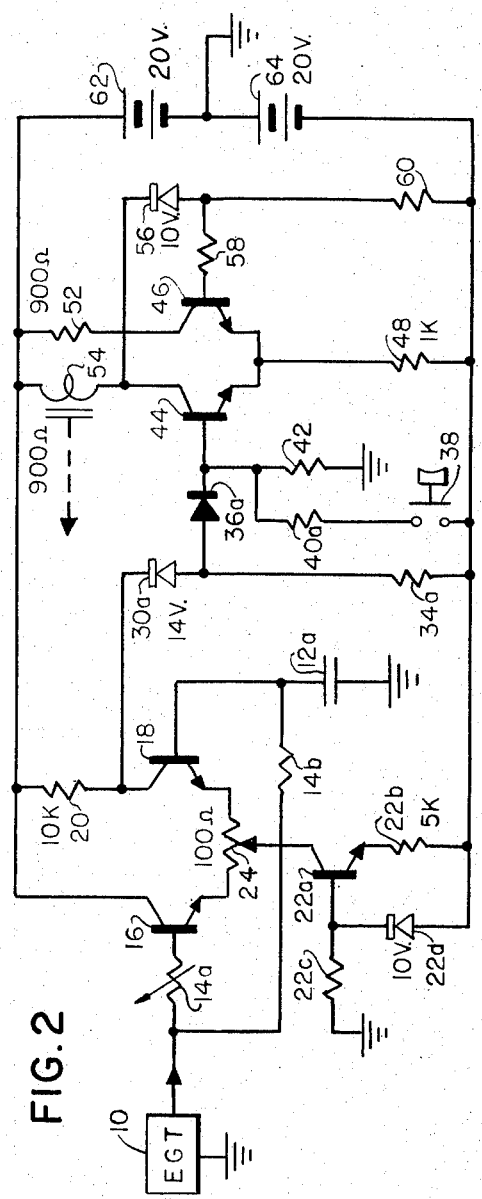
FIGURE 2 is a schematic view showing the second embodiment of my invention employing a low-pass filter circuit in conjunction with a differential amplifier.

Referring now to FIGURE 2, the output of exhaust gas temperature transducer 10 is coupled through a variable resistor 14a to the base of transistor 16 and is further coupled through a resistor 14b to the base of transistor 18. The base of transistor 18 is grounded through a capacitor 12a. Resistor 20 is here placed in the collector circuit of transistor 18. The slider of balancing potentiometer 24 is connected to the collector of a constant-current transistor 22a. The emitter of transistor 22a is connected to the negative terminal of battery 64 through a 5K resistor 22b. The base of transistor 22a is connected backwardly through a 10 volt Zener diode 22d to the negative terminal of battery 64. The base of transistor 22a is further connected to ground through a resistor 22c. The collector output of transistor 18 is coupled to the cathode of a 14 volt Zener diode 30a. The anode of Zener diode 30a is connected through a resistor 34a to the negative terminal of battery 64 and is further coupled forwardly through a rectifier 36a to the base of transistor 44. The base of transistor 44 is connected through a series circuit comprising a resistor 40a and switch 38 to the negative terminal of battery 64. In FIGURE 2 rectifier 50 is not required; and winding 54 is placed in the collector circuit of transistor 44, while resistor 52 is placed in the collector circuit of transistor 46.

In operation of the circuit of FIGURE 2, resistor 14b and capacitor 12a form a low-pass filter; transistors 16 and 18 form a balanced differential amplifier; and transistors 44 and 46 again form a trigger circuit. The quiescent potential at the collector of transistor 18 should be 10 volts so that the quiescent potential at the anode of Zener diode 30a will be −4 volts. If there exists a mismatch in the characteristics of transistors 16 and 18, the slider of potentiometer 14 may again be moved from its center position in order to establish the proper quiescent condition. This backwardly biases rectifier 36a by 4 volts. Each of transistors 16 and 18 pass a current of 1 ma. so that the total current through resistor 22b is 2 ma. This produces a potential at the emitter of transistor 22a of −10 volts, which is equal to the reference potential at the base of transistor 22a provided by Zener diode 22d. Transistor 22a acts as a constant 2 ma. current source. Transistors 46 is conductive; and transistor 44 is non-conductive, since its base is substantially at ground potential while its emitter is at a potential of substantially +1 volt. Accordingly, no current flows through winding 54, and the main fuel flow is inhibited.

If the pilot fuel is ignited, transducer 10 provides, for example, a positive-going output. The potential at the base of transistor 18 remains substantially constant because of the presence of the capacitor 12a. However, the potential at the base of transistor 16 rises by virtue of the current flow through resistor 14a. The conduction of transistor 16 increases and the conduction of transistor 18 decreases, the total current flow remaining constant at 2 ma. The decreased current flow through transistor 18 results in a rise in its collector potential and correspondingly a rise in potential at the anode of Zener diode 30a. When the anode of Zener diode 30a rises through 4 volts to ground potential, conduction takes place through rectifier 36a. However, transistor 44 is still non-conductive since it is negatively biased by one volt. When the anode of Zener diode 30a has risen through 5 volts, from −4 volts to +1 volt, the base of the transistor 44 is driven to a potential of +1 volt; and conduction takes place through transistor 44, triggering the flip-flop. Transistor 44 is rendered conductive and transistor 46 is rendered non-conductive. The current flow through winding 54 again produces a magnetic field which enables the main fuel flow either through a relay solenoid or an hydraulic servo flapper valve.

Resistor 14b and capacitor 12a form a low-pass filter. The time-constant of this filter should be sufficiently small that gradual changes in ambient temperature appear unattenuated at the base of transistor 18. However, the time-constant of this low-pass filter should be sufficiently large that rapid changes in exhaust gas temperature, due to the ignition of pilot fuel, produce substantially no change in voltage at the base of transistor 18. For gradual changes in ambient temperature, the potentials at the bases of transistors 16 and 18 change in synchronism, so that no differential voltages are applied to the differential amplifier comprising transistors 16 and 18. Accordingly the potential at the collector of transistor 18 does not change.

The constant-current transistor 22a is provided to insure that wide changes in ambient temperature produce no change in voltage at the collector of transistor 18. The circuit of FIGURE 2 will operate properly as long as ambient temperature changes do not drive the potential at the emitters of transistors 16 and 18 more positive than +10 volts nor more negative than −10 volts. This affords a range of ambient temperature corresponding to a total change of nearly 20 volts in the output of transducer 10.

The value of resistor 14a may be adjusted so that a rapid change in exhaust gas temperature of, for example, 25° F. results in an increase in potential at the collector of transistor 18 of 5 volts. This adjustment in gain will insure the triggering of the flip-flop even if the ignition of pilot fuel produces the minimum rise in exhaust gas temperature.

The flip-flop, comprising transistors 44 and 46, is reset when an engine is to be restarted by actuating push button 38. The base of transistor 44 must be brought to a potential slightly more negative than −4 volts before conduction will take place through transistor 46 so that regenerative action can occur to reset the flip-flop. Preferably the ratio of resistors 40a and 42 is such that the base of transistor 44 is driven to −8 volts in order to insure reset.

Figure 3:
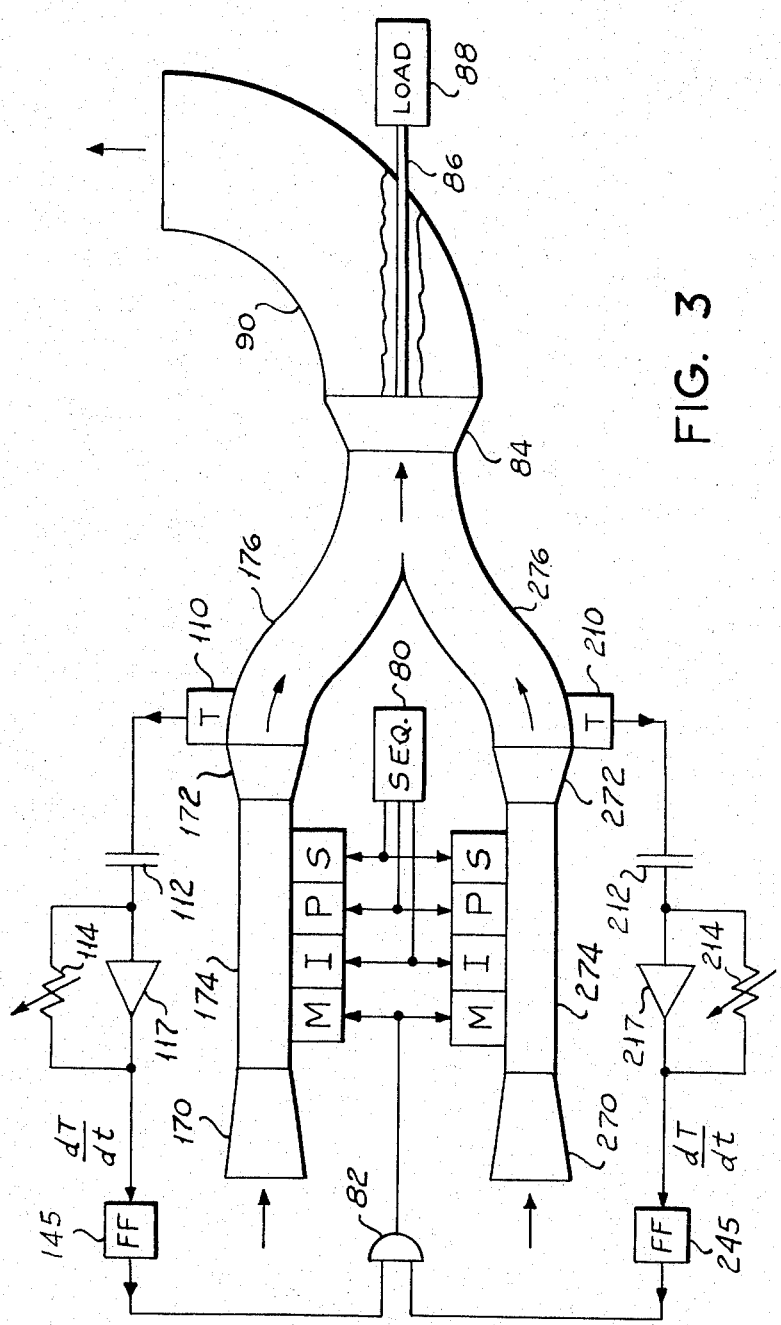
FIGURE 3 is a diagrammatic view showing a gas turbine engine system embodying my invention.

Referring now to FIGURE 3, a first gas turbine generator comprises a compressor 170, a combustor 174, and a turbine 172. A second gas turbine generator comprises a compressor 270, a combustor 274, and a turbine 272. The exhausts of turbines 172 and 272 are connected in parallel through respective conduits 176 and 276 to a free turbine 84, the output shaft 86 of which drives a load 88, such as an electrical generator. The free turbine 84 exhausts through a conduit 90. Transducer 110 measures the temperature of exhaust gases from turbine 172 flowing in conduit 176; and transducer 210 measures the temperature of exhaust gases from turbine 272 flowing in conduit 276. The output of exhaust gas temperature transducer 110 is coupled through a capacitor 112 to the input of a high negative gain, direct-current amplifier 117. Variable feedback resistor 114 couples the output of amplifier 117 to its input. The output of exhaust gas temperature transducer 210 is coupled through a capacitor 212 to the input of a high negative gain, direct-current amplifier 217. The output of amplifier 217 is coupled through a variable feedback resistor 214 to its input. Components 112, 114, and 117 and components 212, 214, and 217 each comprise a differentiating circuit. Accordingly, amplifiers 117 and 217 provide outputs representing the time rate-of-change of exhaust gas temperatures. The outputs of amplifiers 117 and 217 drive respective flip-flops 145 and 245. The outputs of flip-flops 145 and 245 are coupled to the respective inputs of an AND circuit 82. A controller 80 provides sequential outputs which actuate the electrical starter motor, S, the pilot fuel flow, P, and the ignition apparatus, I, of each of the gas turbine generators. The output of AND circuit 82 actuates the main fuel flow, M, of each of the gas turbine generators.

In operation of FIGURE 3, the sequence controller 80 initially actuates the electrical starting motors S of each of the gas generators. After the generators have been brought to starting speed, controller 80 enables pilot fuel flow P and simultaneously actuates the ignition apparatus I of each of the gas generators. If ignition of pilot fuel occurs in combustor 174, then the temperature of the exhaust gas of turbine 172 will rapidly rise by approximately 75° F. The positive-going output of transducer 110 is coupled to the differentiating circuit, which in turn triggers flip-flop 145. The value of resistor 114 should be set sufficiently high that the normal rate-of-change of exhaust gas temperature due to the ignition of pilot fuel will surely trigger the flip-flop. However, the value of resistor 114 should not be set so high that noise from transducer 110 could cause triggering of the flip-flop 145.

It will be appreciated that the differentiation of a signal tends to accentuate any high frequency noise components in the signal. Accordingly transducer 110 may comprise a bridge thermocouple circuit which provides an output relatively free of noise due to power supply fluctuations.

However, the triggering of flip-flop 145 is not alone sufficient to enable the main fuel flow M to either gas generator. If ignition takes place in combustor 274, then a rapid rate-of-change in the output of exhaust gas temperature transducer 210 will occur, producing a sufficient signal from the differentiating circuit to trigger flip-flop 245. The AND circuit 82 provides an output only if both of flip-flops 145 and 245 have been triggered. Thus, AND circuit 82 provides an output only if ignition of pilot fuel has occurred in both gas generators. The output from AND circuit 82 now enables the main fuel flow, M, of both gas generators.

It will be noted that the main fuel flow M to all gas generators is inhibited until it is assured that ignition of pilot fuel has actually occurred in each of the gas generators. This is the purpose of AND circuit 82. Suppose, for the moment, that AND circuit 82 were eliminated; that the output of flip-flop 145 enabled the main fuel flow only in combustor 174; and that the output of flip-flop 245 enabled the main fuel flow only in combustor 274. Further assume that ignition of pilot fuel has occurred only in combustor 174. In such event, the differentiated output of transducer 110 would trigger flip-flop 145, which in turn would enable the main fuel flow in combustor 174. The temperature and pressure in conduit 176 would then rise. A portion of the exhaust gas from turbine 172 would flow through free turbine 84. However, some portion of the exhaust gas from turbine 172 would back through conduit 276 into turbine 272. This would produce an output from transducer 210, erroneously indicating that the pilot fuel in combustor 274 has been ignited. The differentiated output from transducer 210 would trigger flip-flop 245, improperly enabling the main fuel flow to combustor 274. As the raw fuel in combustor 274 accumulates, the hot exhaust gases from turbine 172, backing up through conduit 276, will pass through the turbine 272 and into combustor 274. Sooner or later the accumulated fuel will ignite, producing either an explosion or such high temperatures and pressures as to damage the combustor. The provision of AND circuit 82 prevents the foregoing sequence of events by inhibiting the main fuel flow to all gas generators until it is assured that ignition has actually occurred in each gas generator.

It will be seen that I have accomplished the objects of my invention. Slowly varying changes in ambient temperature have no effect upon my ignition detector circuit. The circuit of FIGURE 1 operates properly no matter what changes in ambient temperature may occur. The circuit of FIGURE 2 operates properly over a very wide range of ambient temperatures. In both embodiments of my invention, I detect increments of change in, rather than absolute values of, the exhaust gas temperature.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A gas turbine fuel ignition detector including in combination a transducer providing a signal indicating an absolute value of exhaust gas temperature, means responsive to the signal for storing a representation of an absolute value of ambient temperature, and means including the transducer and the storage means for determining the incremental change in exhaust gas temperature from ambient temperature occasioned by the ignition of fuel.

2. A gas turbine fuel ignition detector including in combination a transducer providing a signal indicating an absolute value of exhaust gas temperature and means responsive to the signal for determining the incremental change in exhaust gas temperature from ambient temperature occasioned by the ignition of fuel.

3. A gas turbine fuel ignition detector including in combination an exhaust gas temperature transducer providing a direct-current signal, a circuit comprising a resistor connected in series with a capacitor and having a certain time-constant, means for impressing the transducer signal upon the circuit, the time-constant of the circuit being such that slow changes in the signal due to variations in ambient temperature appear across the capacitor while rapid changes in the signal occasioned by the ignition of fuel appear across the resistor, and means responsive to the circuit for sensing that portion of the signal which appears across the resistor.

4. A gas turbine fuel ignition detector including in combination an exhaust gas temperature transducer providing a direct-current signal, a high-pass filter circuit having an input and providing an output, means for applying the signal to the input of the filter circuit, and means responsive to the output of the filter circuit for indicating the ignition of fuel.

5. A gas turbine fuel ignition detector including in combination an exhaust gas temperature transducer providing a direct-current signal, a low-pass filter circuit, a differential amplifier having two inputs and providing an output as a function of the difference between its inputs, means for applying the signal to one input of the amplifier, means including the filter circuit for coupling the signal to the other input of the amplifier, and means responsive to the output of the amplifier for indicating the ignition of fuel.

6. A gas turbine fuel ignition detector including in combination an exhaust gas temperature transducer providing a direct-current signal, a differentiating circuit having an input and providing an output as a function of the time rate-of-change of its input, means for applying the signal to the input of the circuit, and means responsive to the output of the circuit for indicating the ignition of fuel.

7. A system for starting a plurality of gas turbine generators having their exhausts connected in parallel to supply a common expander including in combination means for driving each gas generator to starting speed, means for supplying each generator with pilot fuel, means for actuating ignition apparatus associated with each generator, and means for enabling the main fuel flow of all generators only if ignition of pilot fuel occurs in each gas generator.

8. A system for starting a plurality of gas turbine generators having their exhausts connected in parallel to supply a common expander including in combination means for driving each gas generator to starting speed, means for supplying each generator with pilot fuel, means for actuating ignition apparatus associated with each generator, and means for inhibiting the main fuel flow of all generators until ignition of pilot fuel occurs in each gas generator.

9. A system for starting a plurality of gas turbine generators having their exhausts connected in parallel to supply a common expander including in combination means for driving each gas generator to starting speed, means for supplying each generator with pilot fuel, means for actuating ignition apparatus associated with each generator, each generator being provided with an exhaust gas temperature transducer, and means responsive to each transducer for controlling the main fuel flow of all gas generators.

10. A gas turbine fuel ignition detector including in combination an exhaust gas temperature transducer providing a signal, circuit means responsive to the transducer signal for providing an output as a function of the time rate-of-change of exhaust gas temperature, the circuit means providing a small value output for slow signal changes due to variations in ambient temperature and providing a large value output for rapid signal changes occasioned by the ignition of fuel, and means responsive to the circuit means for sensing a predetermined output which is greater than said small value but less than said large value.

References Cited

UNITED STATES PATENTS

| 2,694,899 | 11/1954 | Hague | 60—39.14 |
| 2,866,385 | 12/1958 | Miller | 60—39.14 X |
| 2,888,801 | 6/1959 | Dotson | 60—39.14 |
| 2,928,002 | 3/1960 | Havstad | 328—150 |

JULIUS E. WEST, *Primary Examiner.*